US011300103B2

(12) United States Patent
Dragonas

(10) Patent No.: US 11,300,103 B2
(45) Date of Patent: Apr. 12, 2022

(54) WIND-POWERED ENERGY GENERATOR SYSTEM

(71) Applicant: Haralambos Theodoros Dragonas, Davie, FL (US)

(72) Inventor: Haralambos Theodoros Dragonas, Davie, FL (US)

( * ) Notice: Subject to any disclaimer, the term of this patent is extended or adjusted under 35 U.S.C. 154(b) by 168 days.

(21) Appl. No.: 16/751,347

(22) Filed: Jan. 24, 2020

(65) Prior Publication Data

US 2020/0240394 A1 Jul. 30, 2020

Related U.S. Application Data

(60) Provisional application No. 62/796,924, filed on Jan. 25, 2019.

(51) Int. Cl.
*F03D 9/28* (2016.01)
*F04B 39/16* (2006.01)
*F03D 9/17* (2016.01)
*F04B 35/00* (2006.01)

(52) U.S. Cl.
CPC ............... *F03D 9/28* (2016.05); *F03D 9/17* (2016.05); *F04B 35/00* (2013.01); *F04B 39/16* (2013.01); *Y02E 10/72* (2013.01); *Y02E 60/16* (2013.01); *Y02E 70/30* (2013.01)

(58) Field of Classification Search
CPC ... F03D 9/28; F03D 9/17; F03D 80/88; F03D 9/10; F03D 9/35; F03D 9/37; F03D 9/39; F03D 9/41; F03D 80/60; F04B 39/16; F04B 35/00; F04B 35/01; F04B 41/02; Y02E 70/30; Y02E 60/16; Y02E 10/72; F05B 2260/64
See application file for complete search history.

(56) References Cited

U.S. PATENT DOCUMENTS

| 4,150,547 A | 4/1979 | Hobson |
| 4,849,648 A | 7/1989 | Longardner |
| 5,599,172 A | 2/1997 | McCabe |

(Continued)

FOREIGN PATENT DOCUMENTS

| GB | 114286 A | * | 3/1918 | ............... F03D 9/17 |
| JP | 04091325 A | * | 3/1992 | |

(Continued)

*Primary Examiner* — Nathan C Zollinger
(74) *Attorney, Agent, or Firm* — John Rizvi; John Rizvi, P.A.—The Patent Professor®

(57) ABSTRACT

An energy generator system is provided that is capable of capturing the transitory energy contained within the wind and converting it to a form of storable energy for later use in generating electricity. The energy generator system includes a compression system including an air compressor for compressing incoming air and a rotor for operating the compressor in response to the wind flowing over the rotor. An intake system is associated with the compression system and provides clean ambient air to the air compressor. The compression system and the intake system c contained in a wind tower having a head for supporting the rotor and an elongate pylon for positioning the rotor at a sufficient height to capture the energy of the wind. The natural energy system additionally includes a storage system for storing the compressed air produced by the air compressor.

16 Claims, 12 Drawing Sheets

(56) References Cited

U.S. PATENT DOCUMENTS

| | | | |
|---|---|---|---|
| 5,924,283 A | 7/1999 | Burke, Jr. | |
| 6,026,349 A | 2/2000 | Heneman | |
| 6,439,832 B1 * | 8/2002 | Siegfriedsen | F03D 13/25 415/4.3 |
| 7,281,371 B1 | 10/2007 | Heidenreich | |
| 7,308,361 B2 | 12/2007 | Enis et al. | |
| 7,504,739 B2 | 3/2009 | Enis et al. | |
| 7,856,843 B2 | 12/2010 | Enis et al. | |
| 8,065,874 B2 | 11/2011 | Fong et al. | |
| 8,109,814 B2 * | 2/2012 | Uchino | F03D 80/60 454/184 |
| 8,138,629 B2 | 3/2012 | Marks De Chabris | |
| 8,247,915 B2 * | 8/2012 | Crane | F04B 17/02 290/44 |
| 8,347,628 B2 | 1/2013 | Gerard | |
| 8,677,744 B2 | 3/2014 | McBride et al. | |
| 9,903,272 B2 | 2/2018 | Enis et al. | |
| 2006/0260312 A1 | 11/2006 | Ingersoll | |
| 2007/0006586 A1 | 1/2007 | Hoffman et al. | |
| 2008/0050234 A1 * | 2/2008 | Ingersoll | F03D 9/25 416/132 B |
| 2009/0021012 A1 | 1/2009 | Stull et al. | |
| 2011/0109094 A1 | 5/2011 | Kenway et al. | |
| 2016/0341498 A1 * | 11/2016 | Lynn | F04B 35/01 |

FOREIGN PATENT DOCUMENTS

| | | | |
|---|---|---|---|
| WO | WO-2010054844 A2 * | 5/2010 | F03D 9/28 |
| WO | WO-2015199450 A1 * | 12/2015 | F03D 3/00 |
| WO | 2017117414 | 7/2017 | |

* cited by examiner

WIND-POWERED ENERGY GENERATOR SYSTEM

CROSS-REFERENCE TO RELATED APPLICATION

This application claims the benefit of U.S. Provisional Patent Application No. 62/796,924, filed on Jan. 25, 2019, which is incorporated-by-reference herein in its entirety.

FIELD OF THE INVENTION

The present invention relates generally to clean energy devices, and more particularly, to a wind-powered energy generator capable of producing energy and storing said energy for later use in generating electricity.

BACKGROUND OF THE INVENTION

It is becoming more important in many countries to limit their dependence on fossil fuel energy sources and to turn to more renewable and environmentally friendly sources of energy. Some of such alternative sources of energy may include solar, hydroelectric and wind powered energy. The utilization of wind power, in particular, is becoming more and more popular as an alternative to fossil fuels.

The utilization of wind power to generate electricity generally includes positioning an electrical generator at the top of a wind tower and using a rotating fan blade to intercept the wind and drive the electrical generator. The electricity produced by the electrical generator is then fed into an electrical grid or system which carries the electricity to the point of use. When many wind tower generators are positioned at a single location the result is often called a wind farm.

However, some limitations arise when producing electricity in this fashion. For instance, the cost of the materials forming the grid is quite high and there are transmission losses in power, the further the electricity has to travel along the wires of the grid. Often, transformers are needed to boost the energy along the length of the grid and additional power may be lost due to thermal losses in the wires themselves. Maintenance of these systems and electrical grids is also costly.

More importantly, the generation of electricity at the site of the wind towers also has another problem. Inherent in the production of electricity is the need to immediately use the power as it cannot be easily stored and certainly not on a large scale. Thus, the electricity generated by the wind tower electrical generator needs to be used quickly or it is wasted or lost. This can greatly increase the cost of operating this type of generator which cost increases are typically passed on to consumers.

Accordingly, there is an established need for a wind-powered energy generation system that can solve at least one of the aforementioned problems. For example, there is a need for a wind-powered energy generation system can produce energy for later use in generating electricity and at a distance from the point of production.

SUMMARY OF THE INVENTION

The present invention is directed to a novel and efficient energy generator system that is capable of capturing the transitory energy contained within the wind and converting it to a form of storable energy for use in generating electricity at a later time. The energy generator system includes a compression system including an air compressor for compressing incoming air and a rotor for operating the compressor in response to the wind flowing over the rotor. The rotor converts the linear force of the wind into rotational mechanical energy for operating the air compressor. An air intake system is provided for supplying clean ambient air to the air compressor and a storage system may be provided for storing the compressed air produced by the air compressor. The compression system and the intake system can be contained in a wind tower having a head for supporting the rotor and an elongate pylon for positioning the rotor at a sufficient height to capture the energy of the wind. The energy generator system may additionally include a cooling system for cooling the compressed air to allow a higher amount of compressed air energy to be stored within a given storage system and a conversion system for converting the compressed air energy back into rotational mechanical energy for producing electricity.

In a first implementation of the invention, an energy generator system comprises an air intake system configured to intake air, a rotor configured to be rotated by wind, and an air compression system comprising an air compressor. The energy generator system is configured to adopt a working configuration in which the rotor is rotating and thereby powering the air compressor, the air compressor is in fluid communication with and receives air from the air intake system, and the air compressor is compressing air received from the air intake system and producing compressed air.

In a second aspect, the energy generator system may further include a compressed air storage system configured to receive compressed air from the air compression system and store the compressed air.

In another aspect, the compressed air storage system may include at least one storage tank and an air outflow line connecting the at least one storage tank to the air compression system.

In another aspect, the compressed air storage system may further include a cooling system configured to cool the compressed air received from the air compression system.

In another aspect, the cooling system may include a bladder, a coolant, and a source of coolant. The bladder may be configured to receive and contain compressed air from the air compression system. The coolant may surround the bladder for cooling compressed air contained within the bladder. The source of coolant may provide coolant to the surroundings of the bladder.

In another aspect, the cooling system may further include a heat exchanger for removing heat from the coolant.

In another aspect, the air compression system may further include one or more intercoolers configured to generate a cooler, compressed air by cooling compressed air received from the air compressor.

In another aspect, the energy generator system may further include a compressed air storage system configured to receive the cooler, compressed air from the one or more intercoolers and store the cooler, compressed air.

In another aspect, the air compression system may further include a drive train connecting the rotor to the air compressor and configured to transmit rotation energy from the rotor to the air compressor.

In another aspect, the energy generator system may further include a wind tower housing and supporting the air compression system at a sufficient height to encounter wind. The wind tower may include a hub and an elongate pylon, wherein the hub supports the rotor and the air compression system and the pylon supports the hub.

In another aspect, the air intake system may be contained within the pylon.

In another aspect, the air intake system may include an air chamber positioned within the pylon, and may further include air intake port in fluid communication with an interior of the air chamber.

In another aspect, the air chamber may feature an upper air chamber section and a lower air chamber section separated by an air circulation device. The lower air chamber section may be configured to receive air from the air intake port. In turn, the air circulation device may be configured to generate a vortex in air passing from the lower air chamber section to the upper air chamber section towards the air compression system.

In another aspect, the intake system may further include a filter positioned within the air chamber and configured to filter particles carried by air flowing through the air chamber from the air intake port towards the air compression system.

In another aspect, the filter may be arranged in a central area of the air chamber, spaced apart from inner sidewalls of the air chamber.

In another aspect, the energy generator system may further include a conversion system configured to convert compressed air produced by the air compression system to electricity.

In another aspect, the conversion system may include at least one air stream generator and an electrical generator. The at least one air stream generator may be configured to receive compressed air produced by the air compression system and convert the received compressed air to rotational mechanical energy. The electrical generator may be configured to produce electricity when powered by the rotational mechanical energy produced by the at least one air stream generator.

In another aspect, the at least one air stream generator may include a plurality of air stream generators and a plurality of valves. The plurality of valves may be operable to regulate flow of compressed air from the air compression system to each air stream generator of the plurality of air stream generators.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient and economical energy generator system that is capable of harnessing the power of the wind and converting the linear energy of the wind into mechanically-generated rotational energy which in turn is used to produce storable compressed air energy for later use in generating electricity.

Figure 1:
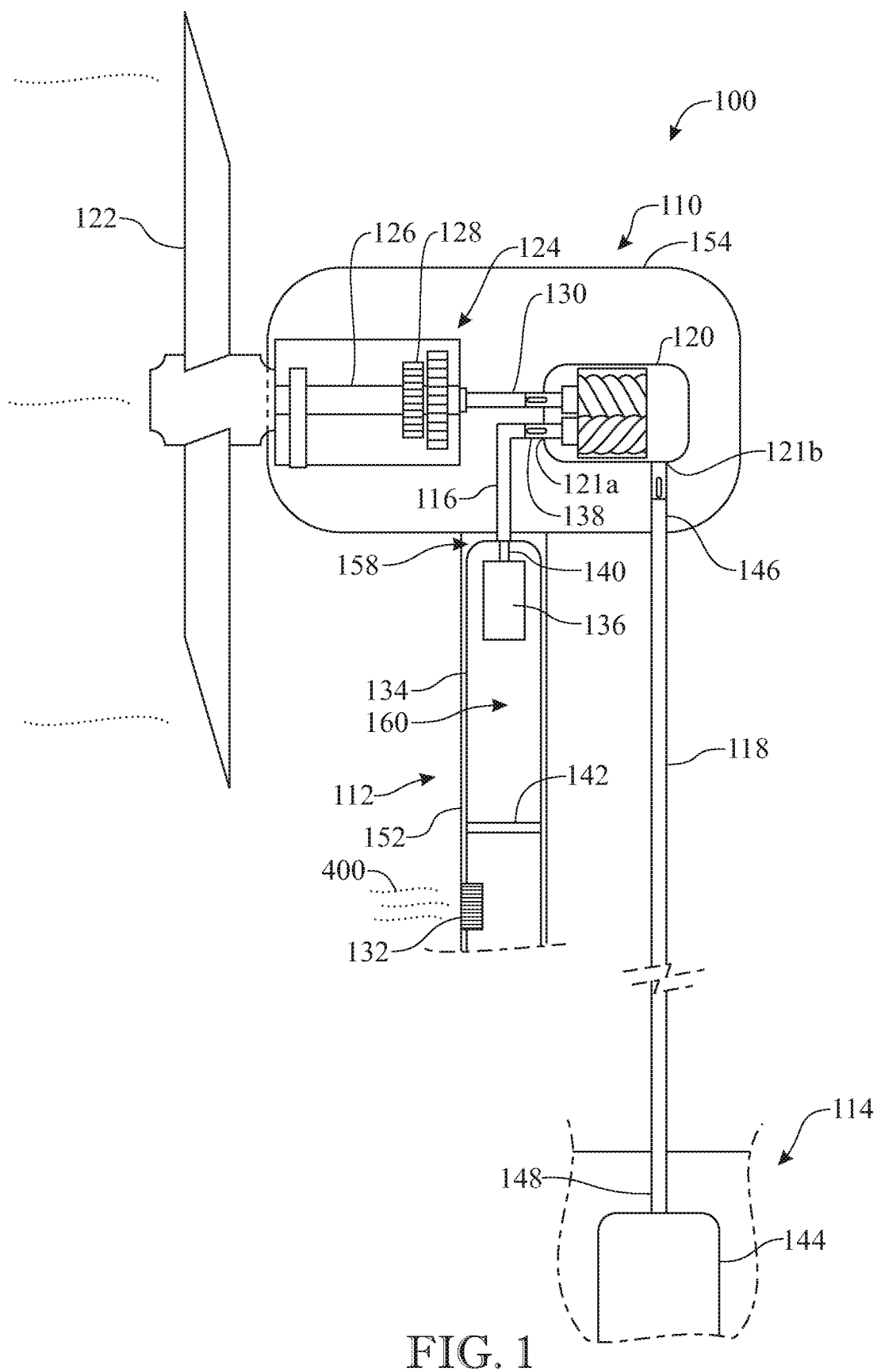
FIG. 1 presents a side diagrammatic view showing an exemplary embodiment of the energy generator system of the present invention, the energy generator system comprising a first type of air compressor.

Referring initially to FIG. 1, an energy generator system 100 is illustrated in accordance with an exemplary embodiment of the present invention, configured as a wind-powered air compression system. As shown, the energy generator system 100 generally includes an air compression system 110, an air intake system 112 for supplying a flow of clean air to the air compression system 110, and a compressed air storage system 114 for storage of the air compressed by the compression system 110. The compressed air storage system 114 stores the compressed air provided by compression system 110 for a period of time and may transmit the stored compressed air over a distance to a location where the compressed air energy can be converted into electricity on demand. As shown, an air intake line 116 extends between the air intake system 112 and the compression system 110, and a compressed air outflow line 118 extends between the compression system 110 and the compressed air storage system 114.

The compression system 110 is provided to convert the fluctuating and temporal energy or power of naturally-occurring, linearly-moving wind to a constant form of stored energy in the form of compressed air. The air compression system 110 includes an air compressor 120 and a multi-bladed fan or rotor 122 movably mounted to, and configured to drive, the air compressor 120. The rotor 122 is configured to be rotated by wind passing over the rotor 122 and to absorb the energy of the wind and convert the energy contained in the linearly moving wind to a form of rotational mechanical energy. The rotational mechanical energy is transmitted from the rotor 122 to the air compressor 120 through a drive train 124. Specifically, the rotor 122 is mounted on a rotor shaft 126 of the drive train 124. The drive train 124 additionally includes a gear assembly 128 connected to the rotor shaft 126 and a drive shaft 130 connecting the gear assembly 128 to the air compressor 120. The rotational energy of the rotor 122 is transmitted through the rotor shaft 126, through the gear assembly 128 and on to the air compressor 120 via the drive shaft 130. The gear assembly 128 is provided to raise the rate of revolutions per minute or "rpm" of the system from a slower rpm at the rotor 122 to a higher rpm at the drive shaft 130 for more efficient use by the air compressor 120. In this manner, the generally linear force of the wind impacting and driving the rotor 122 is converted by the compression system 110 into mechanical rotational energy for use by the air compressor 120.

In some embodiments, as shown in FIG. 1, the air compressor 120 can comprise a drill- or screw-type compressor capable of compressing incoming air and transmitting the compressed air to the compressed air storage system 114 while requiring a low starting torque and being capable of moving large volumes of air, making the system more efficient and able to work at lower wind speed. In other more preferred embodiments, as shown for instance in FIG. 2, the air compressor 120 can comprise a centrifugal air compressor, which is a type of compressor generally capable of delivering high air volume and pressure. For simplicity, references made hereinafter to the air compressor 120 will apply indistinctly to either type of air compressor 120 (drill- or screw-type air compressor of FIG. 1, or centrifugal air compressor of FIG. 2), or to alternative types of air compressors which may potentially be included in the compression system 110, unless expressly stated otherwise. Furthermore, unless expressly stated otherwise, references made to FIG. 2 will also apply to FIG. 1.

Figure 2:
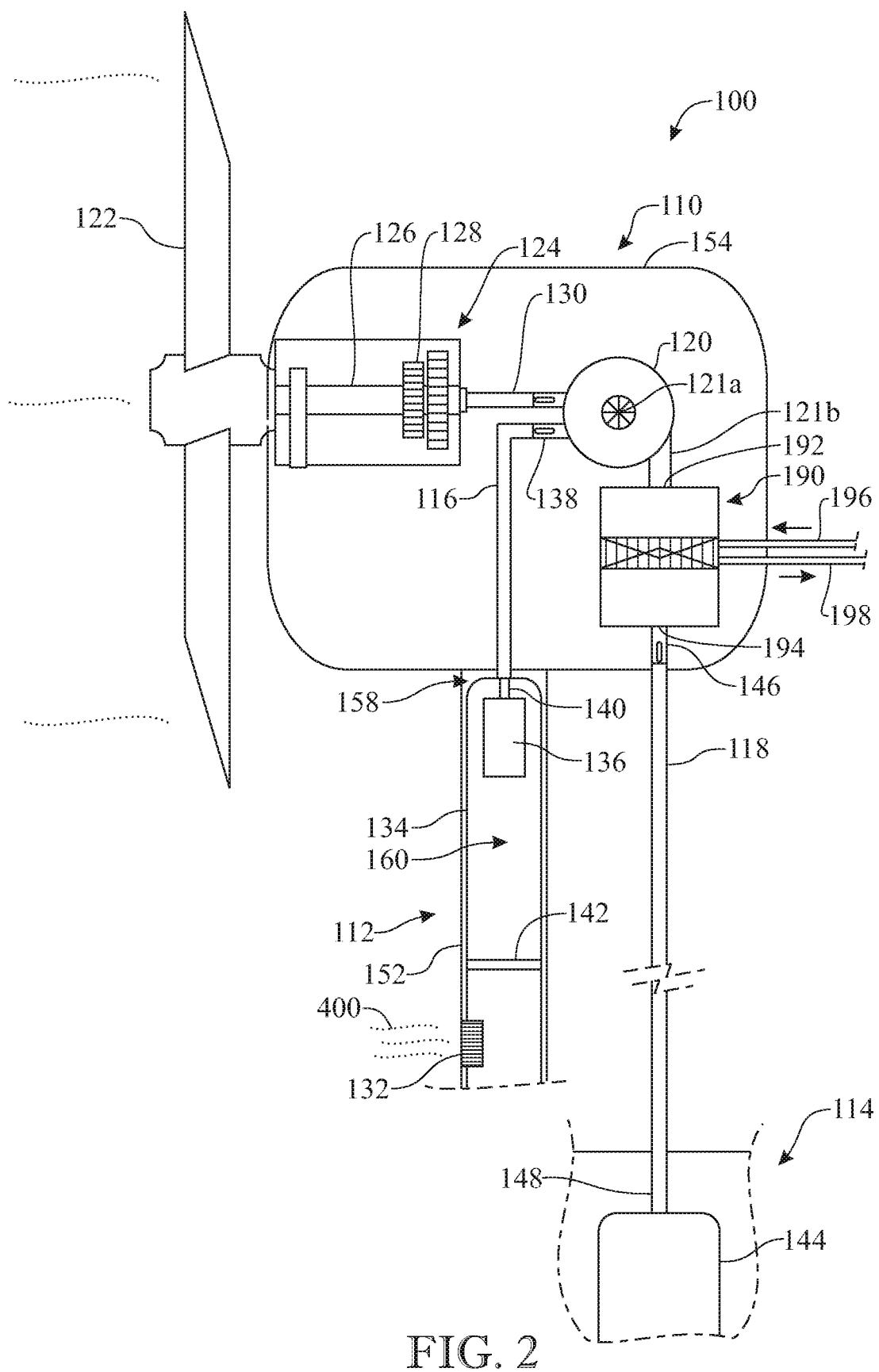
FIG. 2 presents a side diagrammatic view showing an exemplary embodiment of the energy generator system of the present invention, the energy generator system comprising a second type of air compressor.

As shown in FIGS. 1 and 2, the air intake system 112 of the energy generator system 100 includes an air intake port 132 and an air chamber 134. The air intake port 132 receives ambient air from outside the energy generator system 110 and allows the ambient air to pass into the air chamber 134. A micro filter 136 is provided in the air chamber 134 and is connected to the air compressor 120 through the air intake line 116. More specifically, a first end 138 of the air intake line 116 is connected to and in fluid communication with an air intake or air inlet 121a of the air compressor 120, while a second end 140 of the air intake line 116 is connected to and in fluid communication with the micro filter 136. It must be noted that FIG. 2 has been drawn schematically and is omitting lines connecting the first end 138 of the air intake line 116 to the air inlet 121a; however, such lines have been omitted for clarity of the illustration only, as the air inlet 121a is arranged generally at a center of the centrifugal air compressor 120, and it should be equally understood that the first end 138 of the air intake line 116 is connected to and in fluid communication with the air inlet 121a.

With continued reference to FIGS. 1 and 2, the micro filter 136, which may be disposable, is provided to filter out contaminants and particulates that may be present in the ambient air and provide a source of clean, outside air to the air compressor 120. An air circulation device 142 may be provided within the air chamber 134 to facilitate moving the ambient air from the air intake port 132 to the micro filter 136 and cleaning of the air by the micro filter 136 as described in more detail hereinbelow. The air circulation device 142, which is described in greater detail hereinafter, may also serve as a debris remover.

The compressed air storage system 114 is provided to store the compressed air for later use in converting the compressed air to electrical power. In preferred embodiments, the compressed air storage system 114 includes one or more compressed air storage tanks. In different embodiments, the storage tank or tanks can be local or adjacent to the energy generator system 110, shared by two or more energy generator systems 110, remote or physically distant from the energy generator system(s) 110, or combinations thereof. For example, as shown in FIGS. 1 and 2, the compressed air storage system 114 can include a primary storage tank 144 located within or adjacent to the energy generator system 110.

The air compressed by the air compressor 120 of the compression system 112 is transmitted or fed to the compressed air storage system 114 through the compressed air outflow line 118. In some embodiments, such as the example shown in FIG. 1, a first end 146 of the compressed air outflow line 118 is connected to and in fluid communication with an air outlet 121b of the air compressor 120 of the compression system 110. In other embodiments, such as the example shown in FIG. 2, the air outlet 121b of the air compressor 120 is instead connected to an air inlet 192 of a series of one or more intercoolers 190, and the first end 146 of the compressed air outflow line 118 is connected to and in fluid communication with an air outlet 194 of the one or more intercoolers 190. In both examples, a second end 148 of the compressed air outflow line 118 is connected to and in fluid communication with the compressed air storage system 114 (e.g., with the primary storage tank 144 of the compressed air storage system 114).

The aforementioned one or more intercoolers 190, which may be optionally included in the compression system 110 and be provided downstream of the air compressor 120, are configured to cool the compressed air produced by the air compressor 120 prior to feeding the compressed air to the compressed air storage system 114. The one or more intercoolers 190 may cool the compressed air produced by the air compressor 120 by exchanging heat with coolant fed into the one or more intercoolers 190 via one or more coolant intake lines 196. The warmed coolant may be extracted from the one or more intercoolers 190 via a warmed coolant outlet line 198, and heat carried by the warmed coolant may be optionally used for other purposes, industrial processes, etc. It must be noted that, while the one or more intercoolers 190 have been depicted together with the centrifugal air compressor 120, this specific combination shown in the drawings should not be understood as limiting. For example, the one or more intercoolers 190 may be used with alternative types of air compressors (e.g., the drill- or screw-type air compressor 120 of FIG. 1); in another example, the centrifugal air compressor 120 may not be followed by the aforementioned one or more intercoolers 190.

Figure 3:
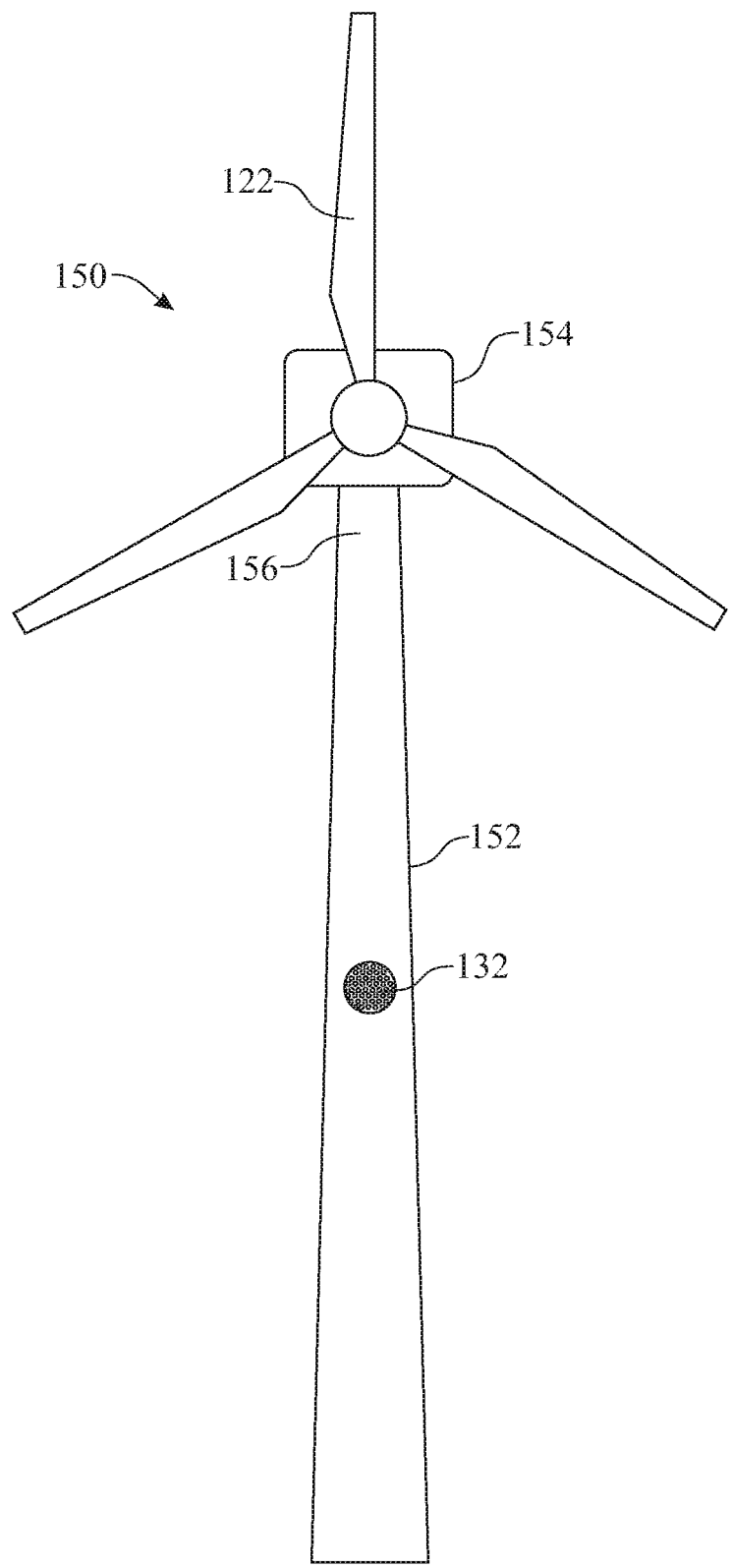
FIG. 3 presents a front diagrammatic view of a wind tower of the energy generator system of the present invention.

Referring now to FIG. 3, the energy generator system 110 includes a wind tower 150 for supporting and housing the compression system 110 and the air intake system 112. The wind tower 150 can be located and mounted at a location that typically receives a reliably steady wind flow to optimize the output of the energy generator system 100. In some embodiments, multiple compression systems 110, each with their respective wind tower 150, may be located together forming a wind park (not shown), which can provide substantial amounts of clean and efficient stored energy for later conversion to electricity. As shown in FIG. 3, the disclosed wind tower 150 includes an elongate tower pylon 152 and a head or hub 154 mounted on a top end 156 of the tower pylon 152. The tower pylon 152 houses the air intake system 112. The air intake port 132 is mounted to and extends through the tower pylon 152 while an interior 158 of the tower pylon 152 (FIG. 4) houses the air chamber 134, micro filter 136 and air circulation device 142 of the air intake system 112. The air intake port 132 is in fluid communication with the air chamber 134.

In turn, the hub 154 of the wind tower 150 supports the rotor 122 of the compression system 110 and houses the air compressor 120, drive train 124, and the one or more intercoolers 190 (if applicable) of the compression system 110. The pylon 152 is of a sufficient height to position the hub 154, and thus the rotor 122, in the path of a sustained wind. In some embodiments, the hub 154 may be rotatably mounted on the top end 156 of the tower pylon 152, such as about a vertical rotation axis, so that the rotor 122 can be best positioned or oriented to take advantage of the naturally occurring wind approaching from any direction.

Figure 4:
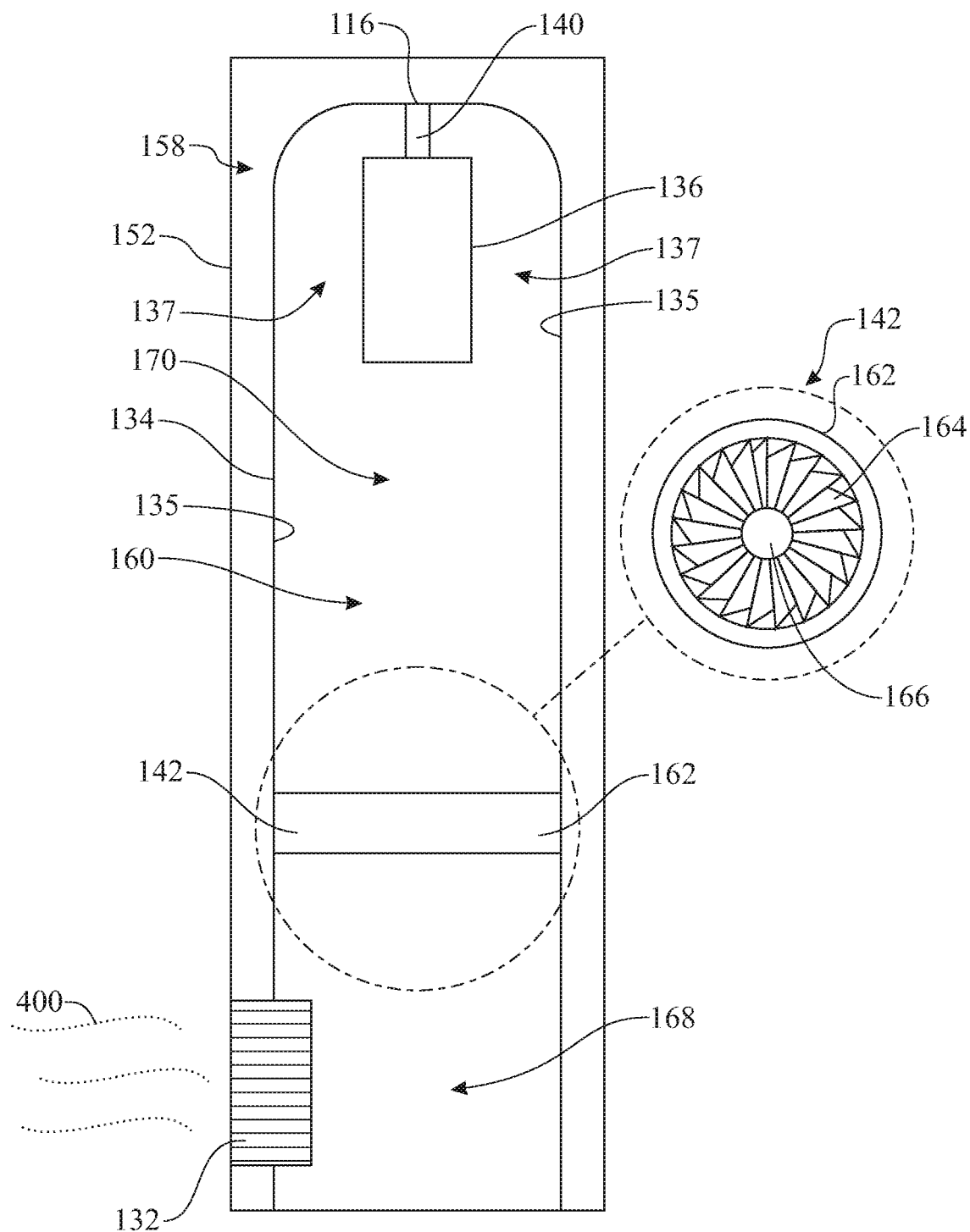
FIG. 4 presents a side diagrammatic view of a portion of the wind tower of the energy generator system of the present invention illustrating an isolated top view of an air circulation device.

As best shown in FIG. 4, the air circulation device 142 is positioned within an interior 160 of the air chamber 134 between the air intake port 132 and the micro filter 136. The air circulation device 142 includes a housing 162 surrounding a plurality of static fan blades 164 which are mounted on a central hub 166. The position of the air circulation device 142 within the interior 160 of the air chamber 134 separates the air chamber 134 into lower and upper chamber sections 168 and 170, respectively. In turn, as shown in the figure, the micro filter 136 is arranged in a (radial-wise) central area of the interior 160 of the air chamber 134, substantially spaced apart from inner sidewalls 135 of the air chamber 134 which face the interior 160 such that a space 137 is thereby formed between the micro filter 136 and the inner sidewalls 135 for purposes that will be hereinafter described.

Figure 5:
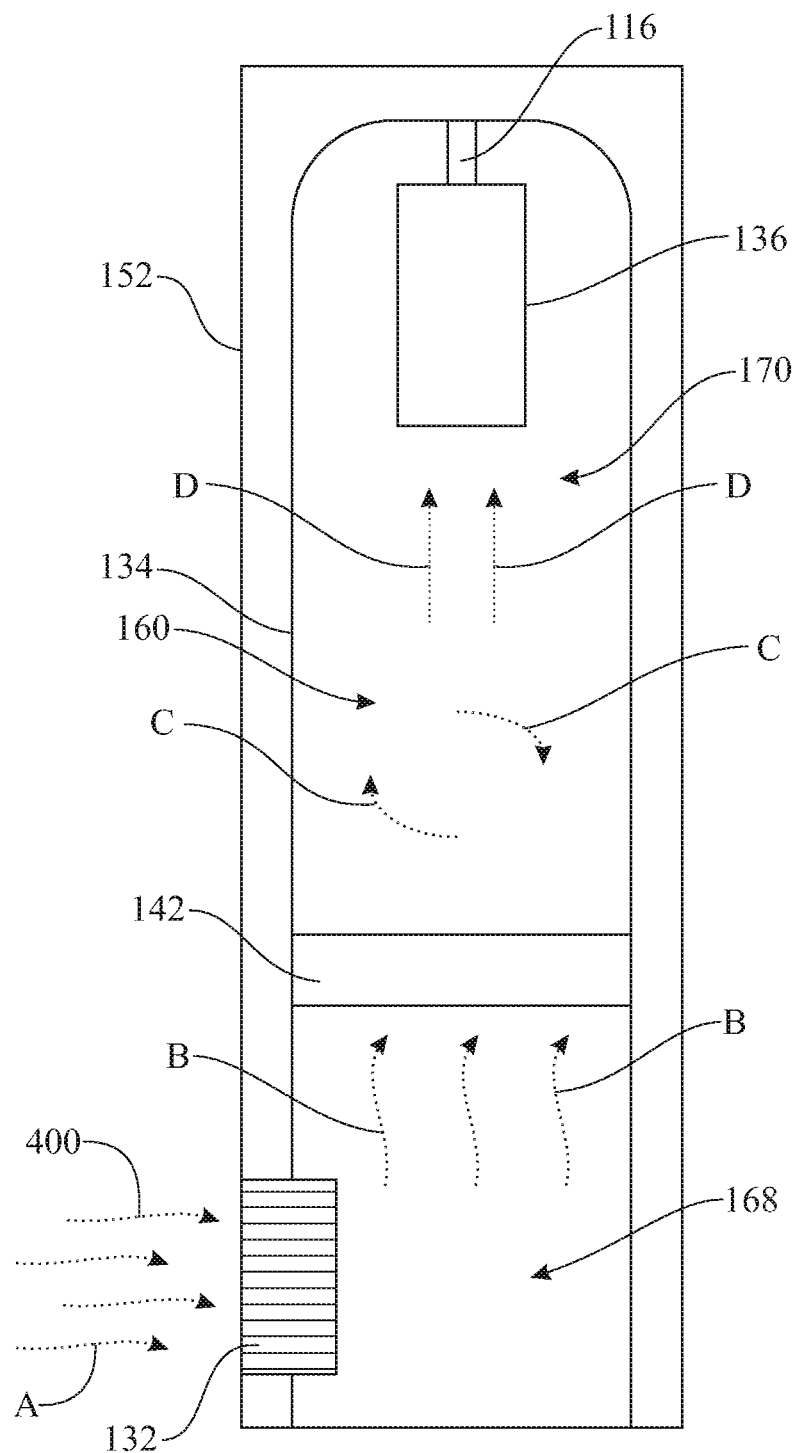
FIG. 5 presents a side diagrammatic view, similar to FIG. 4, illustrating the direction of wind flow through an air intake system of the wind tower of the energy generator system of the present invention.

Referring to FIG. 5, the air intake port 132 allows the flow of ambient air 400 into the lower chamber section 168 and through the air circulation device 142. The air compressor 120 draws air out of the upper chamber section 170 of the air chamber 134 through the micro filter 136. The air circulation device 142 is designed such that air can travel through the static blades 164 (FIG. 4), and due to the angle of the static blades 164, can change direction and be forced to start spinning in the air chamber 134, thereby forming a vortex, while centrifugal force moves debris outwards toward the pylon 152 to initially clean the incoming ambient air 400. The air circulation device 142 also smoothly moves air upward from the lower chamber section 168 to the upper chamber 170 section of the air chamber 134. Specifically, the ambient air 400 is drawn into the air intake port 132 in the direction of arrows "A" where it enters the lower chamber section 168 of the air chamber 134. The ambient air 400 then flows upward in the direction of arrows "B" through the air circulation device 142 and into the upper chamber section 170 of the air chamber 134. The air circulation device 142 may cause the ambient air 400 to swirl in the direction of arrows "C" in a vortex directing the ambient air 400 towards the micro filter 136. The ambient air 400 is then drawn in the direction of arrows "D" into the micro filter 136 for passage into the air compressor 120 through the air intake line 116. It should be noted that as the ambient air 400 is moved through the air chamber 134 it is cooled before it enters the air compressor 120. This provides a slightly denser ambient air 400 to the air compressor 120 facilitating air compression.

Figure 6:
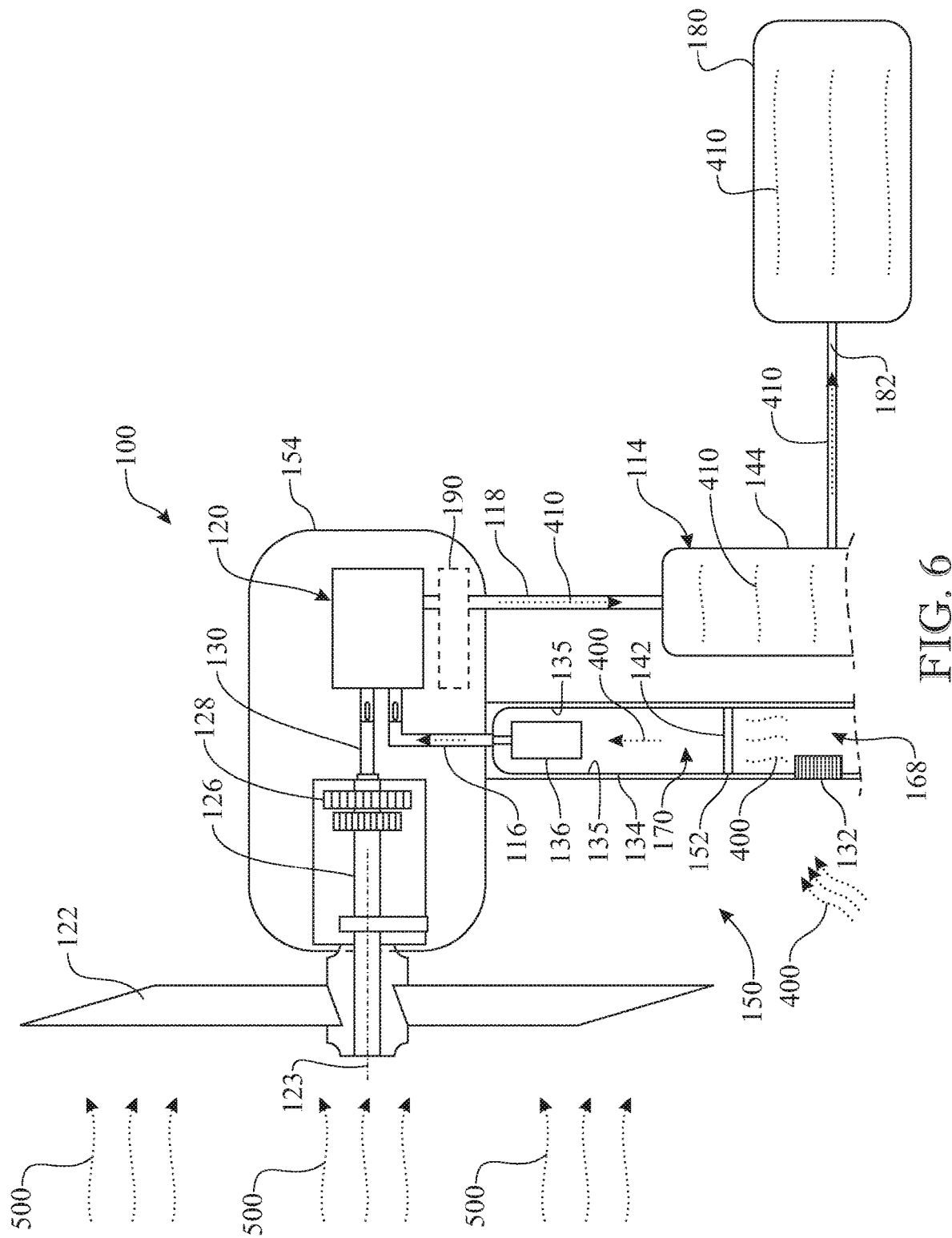
FIG. 6 presents a side diagrammatic view of the energy generator system of the present invention illustrating the direction of wind flow through the energy generator system and transmission of compressed air to an on-site compressed air storage tank system including a wind tower storage tank and a wind park storage tank associated with multiple energy generator systems.

Turning now to FIG. 6, the operation of the energy generator system 100 in harnessing the energy of a relatively linear stream of wind 500, convert the force of the wind 500 into rotational mechanical energy and using that rotational mechanical energy to compress the ambient air 400 into compressed air 410 for storage and later use in generating electricity will now be described. Initially, the hub 154 of the wind tower 150 is oriented such that the rotor 122 is facing directly into the wind 500 to harness as much energy as possible from the wind 500. The wind 500 blows or flows over the rotor 122 such that the rotor 122 is rotated about rotation axis 123 by the wind 500. The speed of rotation of the rotor 122 may be controlled by adjusting the angle or pitch of the rotor 122 to acquire a maximum amount of rotational power from a slow moving wind 500 or reduce the speed of rotation of the rotor 122 in a high velocity wind 500 to prevent over rotation of the rotor shaft 126 and thus damage to the air compressor 120.

As the rotor 122 is rotated by the wind 500, the rotor 122 rotates the rotor shaft 126 and thus the drive shaft 130 through the gear assembly 128. Thus, the linear power of the wind 500 is converted into rotational mechanical energy. This rotational mechanical energy is transmitted to the air compressor 120 by the drive shaft 130 to operate the air compressor 120. It must be noted that the air compressor 120 has been schematically depicted as a box to indicate that the air compressor 120 may include either one of the air compressors 120 described with reference to FIGS. 1 and 2, or others, in different embodiments of the invention.

Once the air compressor 120 is in operation, the air compressor 120 creates a suction to draw ambient air 400 into the wind tower 150 through the air intake port 132. Specifically, and as noted hereinabove, the ambient air 400 is drawn into the lower chamber section 168 of the air chamber 134 through the air intake port 132 and passes upward through the air circulation device 142 and into the upper chamber section 170 of the air chamber 134. As described heretofore, the air circulation device 142 causes the ambient air 400 from the lower chamber section 168 to start spinning and form a vortex which is fed into the upper chamber section 170, while the centrifugal force created by the air spinning throws or projects the debris radially outward towards the inner sidewalls 135 of the chamber, leaving the air cleaner in the middle (i.e. in the radially central area of the upper chamber section 170), where the micro filter 136 is located than in the lateral spaces 137. The cleaner, ambient air 400 is then drawn into and through the micro filter 136 where it is further cleaned prior to passage into the air compressor 120. The cleaned ambient air 400 passes from the micro filter 136 and into the air compressor 120 through the air intake line 116. The spinning caused by the air circulation device 142 can also cool the air down for better efficiency.

Once the ambient air 400 has entered the air compressor 120 through the air intake line 116, the ambient air 400 is compressed by the air compressor 120 into a source of compressed air 410. Operation of the air compressor 120 forces the now compressed air 410 down through the one or more intercoolers 190 (if applicable), through the compressed air outflow line 118 and into the primary storage tank 144 of the compressed air storage system 114. It should be noted that the primary storage tank 144 of the compressed air storage system 114 depicted herein is located immediately within or adjacent to or very near the wind tower 150. The compressed air 410 may be used immediately or at later date to run an electricity producing generator as described hereinbelow.

With continued reference to FIG. 6, and as noted hereinabove, multiple energy generator systems 100, including wind towers 150, may be provided at a single general location or site to create a wind energy park (not shown). Where there are multiple energy generator systems 100 at a single site, all the compressed air 410 generated by these energy generator systems 100 may be stored in a single or main wind park storage tank 180, for instance and without limitation. Multiple, in-park transfer lines 182 may be provided between the individual primary storage tanks 144 of the energy generator systems 100 and the main wind park storage tank 180.

Figure 7:
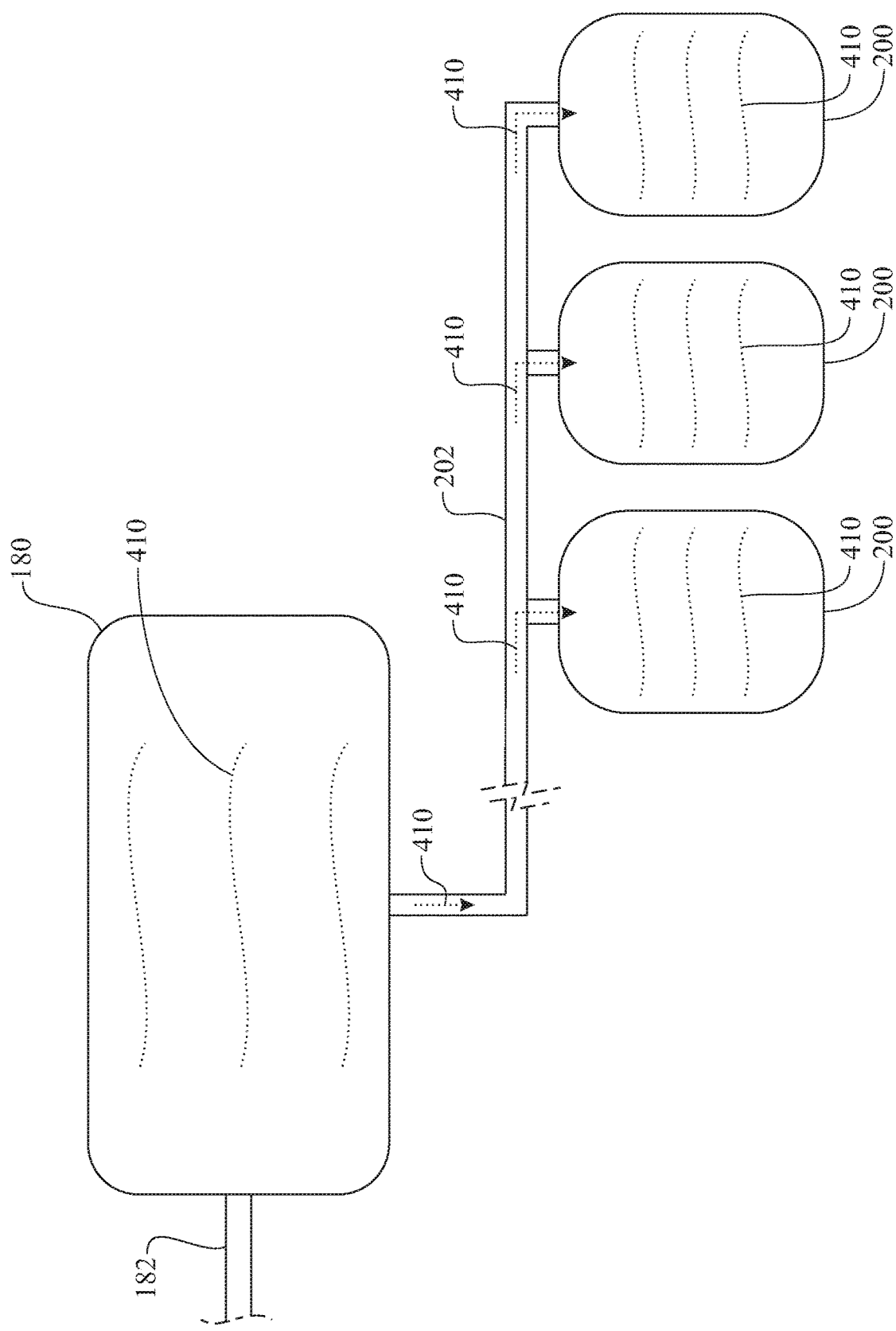
FIG. 7 presents a side diagrammatic view of the on-site compressed air storage tank system, a transmission line and an off-site compressed air storage tank system, including a plurality of underground main storage tanks, associated with the energy generator system of the present invention and located down line from the on-site compressed air storage tank system of the energy generator system.
Figure 8:
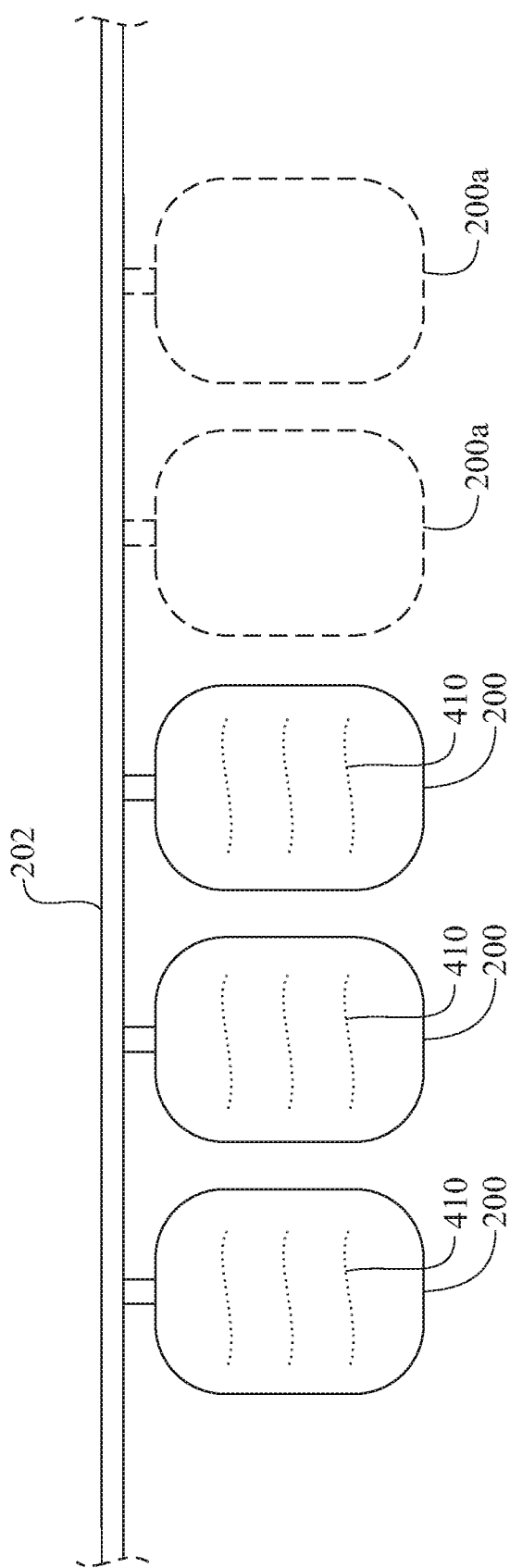
FIG. 8 presents a side diagrammatic view of the off-site compressed air storage tank system associated with the energy generator system of the present invention illustrating the potential for expansion of the off-site system capacity through additional underground main storage tanks.

Referring now to FIGS. 7 and 8, in accordance with the present invention, the compressed air 410 obtained by compressing outside air 400 in order to generate electricity, and thus the energy contained therein, can be stored until it is actually needed due to electrical demand. Further, by maintaining a constant pressure of the compressed air 410, the energy contained therein is capable of being transported over great distances to a point or points of need. For example, the compressed air 410 contained in the main wind park storage tank 180 may be transferred at constant pressure and over great distances to off-site storage tanks 200 through one or more transfer lines 202. The transfer lines 202 may be formed from a compressed air Teflon pipe, for instance and without limitation. As best shown in FIG. 8, the capacity of the off-site storage in accordance with the present disclosure is limited only by the number of off-site storage tanks 200 available and is thus easily expandable through the addition of other off-site storage tanks 200a, at the same or differing locations, to increase the stored energy capacity.

The provision and operation of the energy generator system 100 to capture the power and energy of the wind 500 and store that energy as compressed air 400 in one or more on-site primary storage tanks or main wind park storage tanks and/or transfer that compressed air to one or more off site storage tanks 200 constitutes a first stage in converting the power of the wind 500 into electrical energy.

Figure 9:
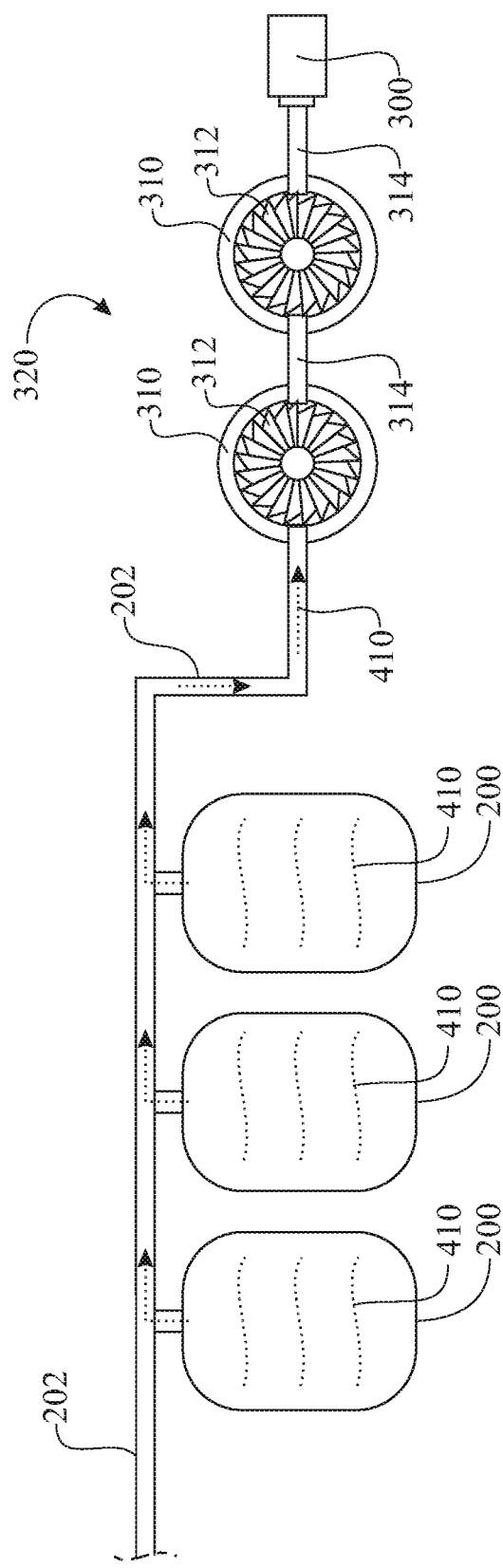
FIG. 9 presents a side diagrammatic view of the off-site compressed air storage tank system and an energy conversion system, associated with the energy generator system of the present invention, for converting compressed air energy to electrical energy.

Referring to FIG. 9, a second stage of converting the power of the wind 500, and specifically the compressed air 410, into electricity is disclosed. In this second stage, the energy contained within the compressed air 410 is converted back into rotational mechanical energy for running an electrical generator 300 to produce electricity. Here, the compressed air 410, contained within the off-site storage tanks 200, is conveyed by the transfer line 202 to one or more air turbines or air stream generators 310, which convert the compressed air energy into a mechanical rotation force. Specifically, as the compressed air 410 is released into the air stream generators 310, the compressed air 410 expands and rotates fans 312 within the air stream generators 310. As the fans 312 are rotated, they in turn rotate generator shafts 314 connected to the fans 312. The generator shafts 314 in turn operate the electrical generator 300 to produce electricity. Thus, the electrical generator 300 and the air stream generators 310 form a conversion system 320 for converting the stored energy in the compressed air 410 back into rotational mechanical energy. The rotational mechanical energy carried by the generator shafts 314 is transmitted to the electrical generator 300 which then produces electricity for use by the customer or general public.

In this manner, the energy generator system 100 captures the energy contained within the wind 500 (by using said energy to generate compressed air 410), stores the energy (compressed air 410) for later use depending on distance or demand and converts that stored energy into electrical energy for use by the public as needed.

Figure 10:
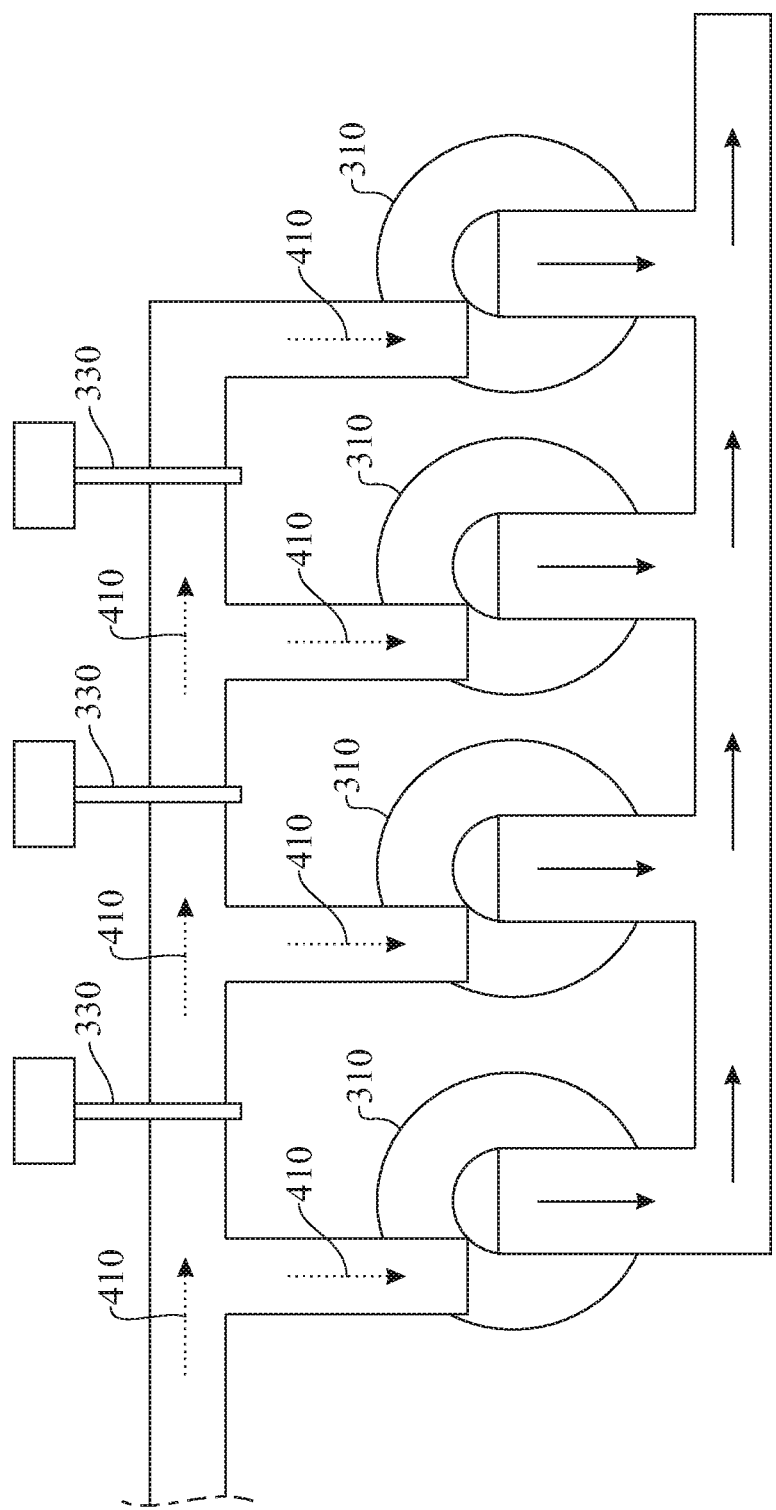
FIG. 10 presents a side diagrammatic view of the off-site compressed air storage tank system and an energy conversion system, associated with the energy generator system of the present invention, for converting compressed air energy to electrical energy, further illustrating a dynamic manifold configuration selectively feeding compressed air into a plurality of air turbines as controlled by operable airflow control valves.

The energy generator system 100 of the present disclosure can be easily and advantageously scaled to different sizes and in order to create different-sized power plants on demand. For example, as described heretofore, a variable number of compression systems 110 and associated wind towers 150, and/or compressed air storage tanks, may be included in order to scale the energy generator system 100. Furthermore, as shown in FIG. 10, the number of air stream generators 310 may be varied in order to generate different magnitudes of electrical power, further contributing to obtain an energy generator system 100 which is flexible for any size system. The energy generator system 100 may further include operable valves 330 configured to control the flow of compressed air 410 to each air stream generator 310. The valves 330 may be controlled by one or more electronic processors responsively to data received from sensors comprised in the system, and configured to measure air pressure, air volume, and other variables associated to the compressed air 410. This allows to stack a plurality of air stream generators 310 to accommodate the demand of electrical energy to be provided by the energy generator system 100. If air flow becomes less than sufficient to run the air stream generators 310, the valves 410 may shut off each air stream generator 310 until the pressure and volume are restored, thus keeping the energy generator system 100 as efficient as possible. Thus, the number of air turbines or air stream generators 310 is dynamically adjustable in dependence of the desired electrical power output, available compressed air (compressed air pressure), etc.

Figure 11:
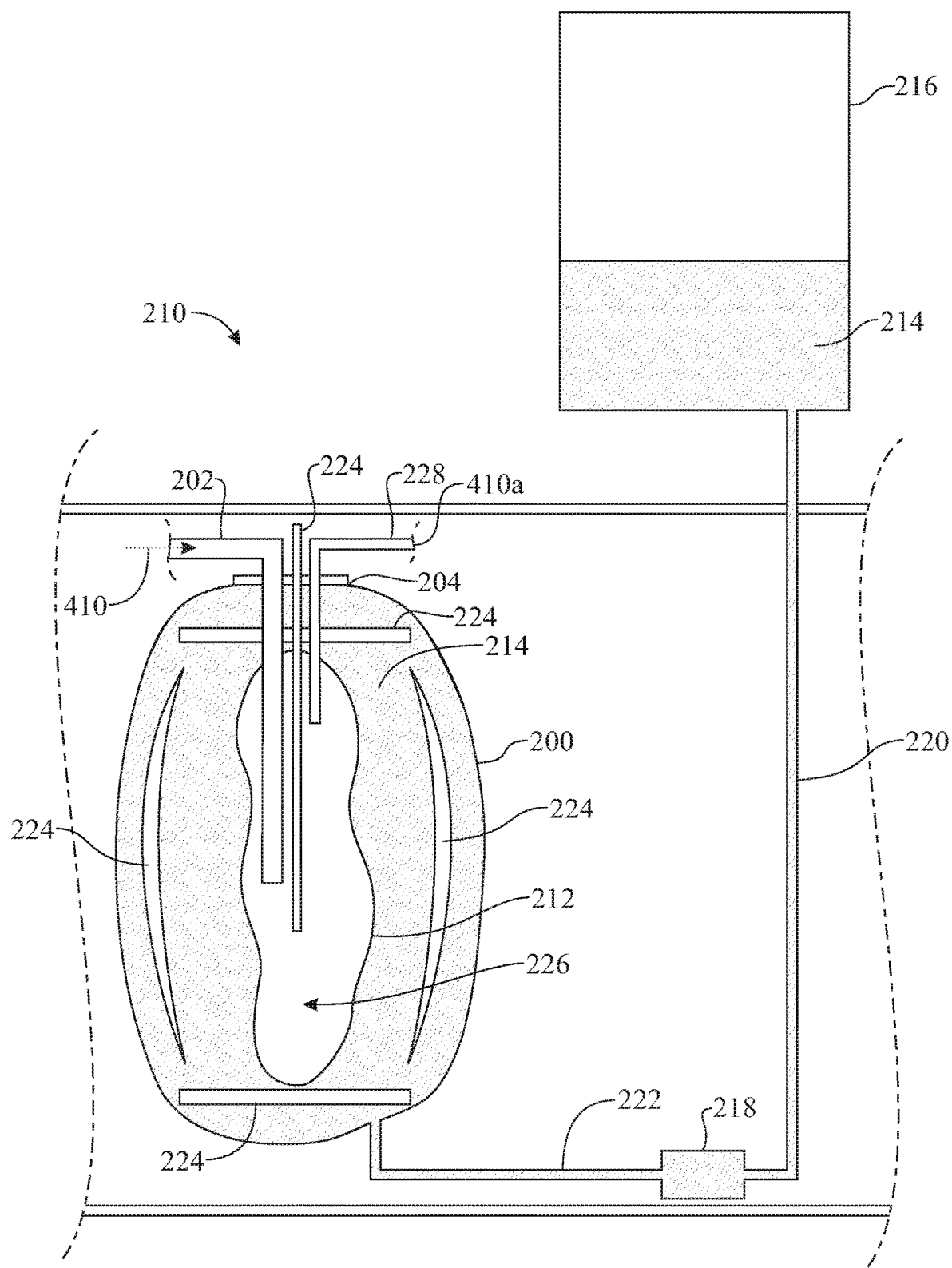
FIG. 11 presents a side diagrammatic view of a compressed air cooling system of the energy generator system of the present invention.
Figure 12:
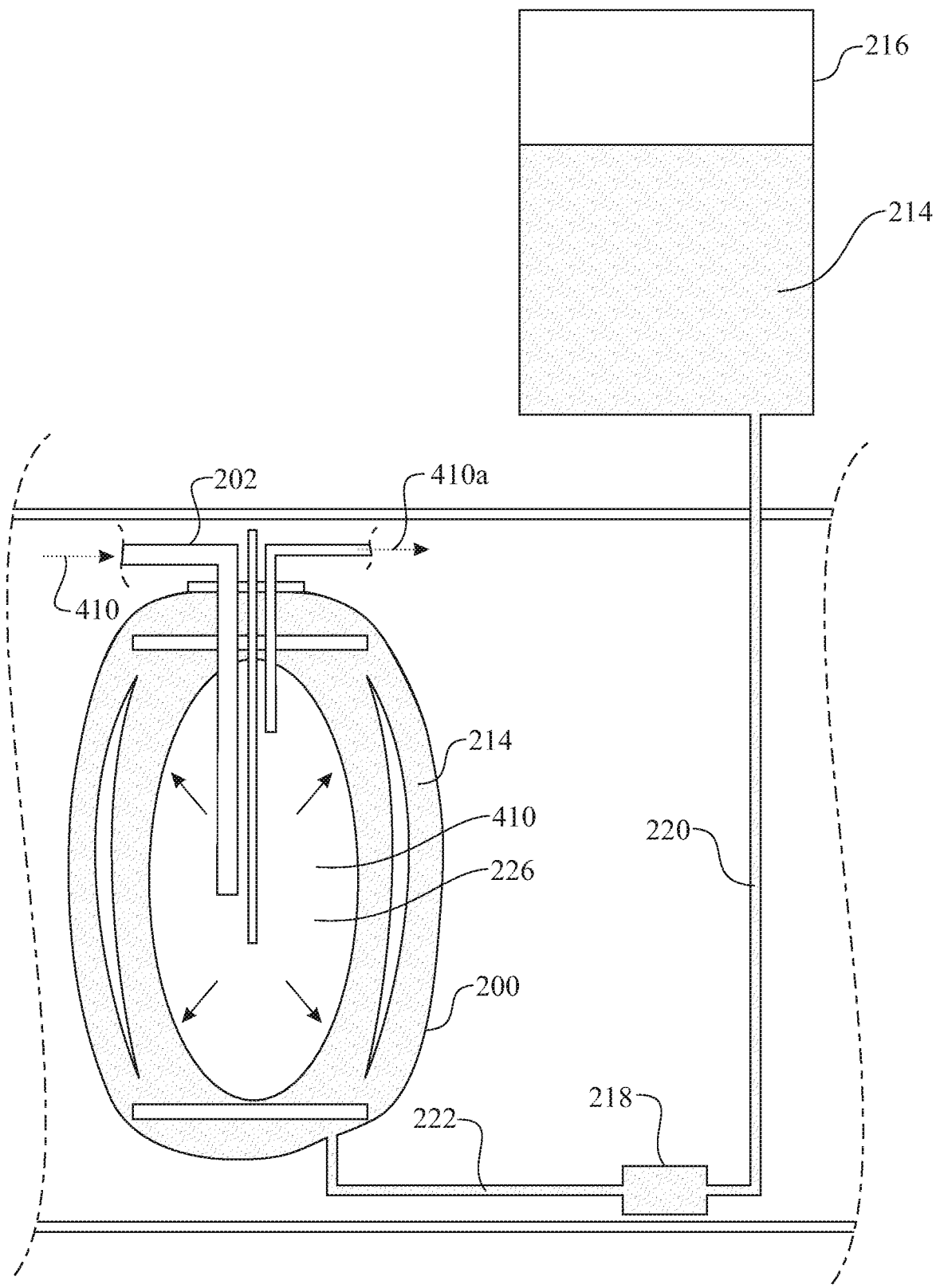
FIG. 12 presents a side diagrammatic view of the compressed air cooling system of FIG. 9 during a stable air flow condition.

Referring now to FIGS. 11 and 12, in order to increase the efficiency of the disclosed energy generator system 100, there is provided a cooling system 210 for use with the primary storage tank 144, the main wind park storage tank 180 and/or the off-site storage tanks 200. For purposes of discussion, the cooling system 210 will be discussed with regard to the off-site storage tank 200. The cooling system 210 generally includes a flexible inflatable bladder 212 positioned within the storage tank 200 and a coolant 214 removably located within the storage tank 200 and outside of the bladder 212. The transfer line 202 is in fluid communication with the bladder 212 which is housed inside the storage tank 200. A coolant tank 216 is provided to supply the coolant 214 to the storage tank 200 and a heat exchanger 218 is provided to draw off excess heat from the coolant 214 as the coolant 214 absorbs heat from the compressed air 410. The coolant tank 216 is in fluid communication with the heat exchanger 218 through a tank line 220. For instance, as shown, the tank line 220 may provide fluid communication between a base of the coolant tank 216 and a base of the storage tank 200. The coolant tank 216 may be arranged generally higher than the storage tank 200 to promote gravity and fluid pressure tending to fill the storage tank 200 with coolant 214, optionally in its entirety (i.e. optionally to a top 204 of the storage tank 200). In turn, the heat exchanger 218 is in fluid communication with the bladder 212 through a bladder line 222. The bladder 212 may include one or more internal or external bladder supports 224 to assist in maintaining the shape of the bladder 212 and preventing complete collapse in the absence of compressed air 410.

In use, initially, the bladder 212 is generally deflated or collapsed and most of the coolant 212 is retained within the storage tank 200. As pressurized compressed air 410 enters an interior 226 of the bladder 212 through the transfer line 202, the compressed air 410 expands the bladder 212 and is cooled to a lower temperature by the surrounding coolant 214, forming cooled compressed air 410a. As the bladder 212 expands, it also forces the coolant 214 out of the storage tank 200 through the bladder line 222 and into the heat exchanger 218 where the heat absorbed by the coolant 214 is drawn off by cooler coolant 214 from the coolant tank 216. Pressure exerted by the expanded bladder 212 can optionally force the coolant 214 up into the coolant tank 216. Since the cooling system 210 is gravity fed and the coolant tank 216 located at a higher elevation than the storage tank 200, the coolant 214 is always maintaining pressure on the bladder 212 within the storage tank 200.

The ideal gas law provides that $PV=nRT$, where P is the gas pressure within a vessel, V is the volume of gas within the vessel and T is the temperature of the gas within the vessel. The remaining factors "n" and "R" are constants, where n is the number of moles in the gas and R is a gas constant. Therefore, since the pressure of the compressed air 410 flowing into and the pressure of the cooled compressed air 410a flowing out of the storage tank 200 and, in particular, the bladder 214, is kept constant, by decreasing the temperature of the compressed air 410 through exposure to the coolant 214, the volume of the cooled compressed air 410a is decreased or made more dense thus allowing more cooled compressed air 410a to be contained within a given fixed volume of the storage tank 200 than would be the case if the compressed air 410 remained at ambient temperature. The cooling system 210 disclosed herein therefore increases the efficiency of the energy generator system 100 by cooling the compressed air stored inside a given storage tank and thereby increasing the mass of compressed air which can be stored within said given storage tank.

While the above description of the cooling system 210 has been provided with reference to storage tank 200, the same cooling system may be incorporated into any compressed air tanks comprised in the energy generator system 100, such as, but not limited to, the primary storage tank 144 and/or the main wind park storage tank 180 described heretofore. In fact, incorporating the cooling system 210 into all the storage tanks associated with the energy generator system 100 drastically increases the efficiency of the system as the air passes through the first and second stages of the system as described hereinabove.

The flexibility of the bladder 212 further allows to equalize or stabilize abnormal occurring pressures, from a sudden wind power change or a sudden air volume change in the system. The flexibility of the bladder 212 will take the pressure difference (up to its mechanical limits) and normalize pressure. The weight of the coolant 214 fed by gravity will keep the bladder 212 always to a collapse, so the forces between the weight of the coolant 214 and the air pressure in the bladder 212 can "battle" for the best outcome.

Finally, the now cooled compressed air 410a can pass out through an outflow transfer line 228 to the second stage including the air stream generators 310 (FIG. 9 or 10) or to additional storage tanks for further storage or additional cooling.

Thus, in this manner the energy generator system 100 incorporating the cooling system 210 provides a novel and efficient means of capturing and storing wind energy in the form of compressed air for later use in generating electricity.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An energy generator system comprising:
   a wind tower, comprising a hub and an elongate pylon supporting the hub;
   a rotor supported by the hub and configured to be rotated by wind;
   an air compression system, housed and supported by the hub at a sufficient height to encounter wind, the air compression system comprising an air compressor; and
   an air intake system contained within the pylon and configured to intake air, the air intake system comprising an air chamber positioned within the pylon and an air intake port in fluid communication with an interior of the air chamber, the air chamber comprising an upper air chamber section and a lower air chamber section separated by an air circulation device, wherein the lower air chamber section is configured to receive air from the air intake port, and the air circulation device is configured to generate a vortex in air passing from the lower air chamber section to the upper air chamber section towards the air compression system; wherein
   the energy generator system is configured to adopt a working configuration in which the rotor is rotating and thereby powering the air compressor, the air compressor is in fluid communication with and receives air from the air intake system, and the air compressor is compressing air received from the air intake system and producing compressed air.

2. The energy generator system of claim 1, further comprising a compressed air storage system configured to receive compressed air from the air compression system and store the compressed air.

3. The energy generator system of claim 2, wherein the compressed air storage system comprises at least one storage tank and an air outflow line connecting the at least one storage tank to the air compression system.

4. The energy generator system of claim 2, wherein the compressed air storage system further comprises a cooling system configured to cool the compressed air received from the air compression system.

5. The energy generator system of claim 4, wherein the cooling system comprises a bladder configured to receive and contain compressed air from the air compression system, a coolant surrounding the bladder for cooling compressed air contained within the bladder, and a source of coolant.

6. The energy generator system of claim 5, wherein the cooling system further comprises a heat exchanger for removing heat from the coolant.

7. The energy generator system of claim 1, wherein the air compression system further comprises one or more intercoolers configured to generate a cooler, compressed air by cooling compressed air received from the air compressor.

8. The energy generator system of claim 7, further comprising a compressed air storage system configured to receive the cooler, compressed air from the one or more intercoolers and store the cooler, compressed air.

9. The energy generator system of claim 1, wherein the air compression system further comprises a drive train connecting the rotor to the air compressor and configured to transmit rotation energy from the rotor to the air compressor.

10. The energy generator system of claim 1, wherein the intake system further comprises a filter positioned within the air chamber and configured to filter particles carried by air flowing through the air chamber from the air intake port towards the air compression system.

11. The energy generator system of claim 10, wherein the filter is arranged in a central area of the air chamber, spaced apart from inner sidewalls of the air chamber.

12. The energy generator system of claim 1, further comprising a conversion system configured to convert compressed air produced by the air compression system to electricity.

13. The energy generator system of claim 12, wherein the conversion system comprises at least one air stream generator and an electrical generator, wherein the at least one air stream generator is configured to receive compressed air produced by the air compression system and convert the received compressed air to rotational mechanical energy, and further wherein the electrical generator is configured to produce electricity when powered by the rotational mechanical energy produced by the at least one air stream generator.

14. The energy generator system of claim 13, wherein the at least one air stream generator comprises a plurality of air stream generators and a plurality of valves, wherein the plurality of valves is operable to regulate flow of compressed air from the air compression system to each air stream generator of the plurality of air stream generators.

15. An energy generator system comprising:
a wind tower, comprising a hub and an elongate pylon supporting the hub;
a rotor supported by the hub and configured to be rotated by wind;
an air compression system, housed and supported by the hub at a sufficient height to encounter wind, the air compression system comprising an air compressor;
an air intake system contained within the pylon and configured to intake air, the air intake system comprising an air chamber positioned within the pylon and an air intake port in fluid communication with an interior of the air chamber, the air chamber comprising an upper air chamber section and a lower air chamber section separated by an air circulation device, wherein the lower air chamber section is configured to receive air from the air intake port, and the air circulation device is configured to generate a vortex in air passing from the lower air chamber section to the upper air chamber section towards the air compression system; and
a compressed air storage system configured to receive compressed air from the air compression system and store the compressed air; wherein
the energy generator system is configured to adopt a working configuration in which the rotor is rotating and thereby powering the air compressor, the air compressor is in fluid communication with and receives air from the air intake system, the air compressor is compressing air received from the air intake system and producing compressed air, and the air compression system is providing compressed air to the compressed air storage system.

16. An energy generator system comprising:
a wind tower comprising a hub and an elongate pylon supporting the hub;
an air intake system contained within the pylon and configured to intake air, wherein the air intake system comprises an air chamber and an air intake port in fluid communication with an interior of the air chamber, wherein the air chamber comprises an upper air chamber section and a lower air chamber section separated by an air circulation device, wherein the lower air chamber section is configured to receive air from the air intake port and the air circulation device is configured to generate a vortex in air passing through the air circulation device, and further wherein the air intake system comprises a filter arranged in a central area of the air chamber, spaced apart from inner sidewalk of the air chamber, and configured to filter particles carried by air flowing through the upper air chamber section;
a rotor carried by the hub and configured to be rotated by wind;
an air compression system contained within the hub and comprising an air compressor; and
a compressed air storage system comprising at least one storage tank configured to receive compressed air from the air compression system and store the compressed air; wherein
the energy generator system is configured to adopt a working configuration in which:
the rotor is rotating and thereby powering the air compressor,
the air compressor is in fluid communication with the air intake system and is receiving air from the air intake system by suctioning and causing an airflow from the air intake port to the air compressor via the lower air chamber section, the air circulation device, and the upper air chamber section, the air circulation device is producing a vortex in air flowing therethrough, wherein centrifugal forces within the vortex project debris carried by the air radially outward, the filter is allowing the passage therethrough of air from a central area of the vortex towards the air compressor, and the air compressor is compressing air received from the filter of the air intake system and producing compressed air, and the air compression system is providing compressed air to the compressed air storage system.

\* \* \* \* \*